United States Patent

Ozue et al.

[11] Patent Number: 5,886,843
[45] Date of Patent: Mar. 23, 1999

[54] RECORDING AND PLAYBACK APPARATUS USING A HELICAL-SCAN-TYPE ROTARY HEAD

[75] Inventors: Tadashi Ozue, Kanagawa; Joichi Daiba, Tokyo, both of Japan

[73] Assignee: Sony Corporation, Tokyo, Japan

[21] Appl. No.: 971,231

[22] Filed: Nov. 14, 1997

Related U.S. Application Data

[63] Continuation of Ser. No. 510,846, Aug. 3, 1995, abandoned.

[30] Foreign Application Priority Data

Aug. 8, 1994 [JP] Japan .................................. 6-205938

[51] Int. Cl.$^6$ ........................... G11B 15/14; G11B 15/12; H04N 9/79
[52] U.S. Cl. .................................. 360/64; 360/62; 386/23
[58] Field of Search .............................. 360/33.1, 61, 64, 360/10.3, 62, 76; 386/1, 35, 21, 46, 113, 131, 74, 23

[56] References Cited

U.S. PATENT DOCUMENTS 5,311,375  5/1994  Ikushima et al. ..................... 360/64
5,412,517  5/1995  Fujimori ................................. 360/64
5,606,465  2/1997  Cramer et al. ........................ 360/48

FOREIGN PATENT DOCUMENTS 1-277304  11/1989  Japan .............................. G11B 5/09

*Primary Examiner*—Aristotelis M. Psitos
*Assistant Examiner*—Regina Y. Neal
*Attorney, Agent, or Firm*—Frommer Lawrence & Haug, LLP.; William S. Frommer

[57] ABSTRACT

In order to enable both reproduction of the azimuth-recorded old format and recording and reproduction of the new format of a different azimuth angle without increasing the number of heads, the number of channels of rotary transformers and the number of changeover switched, attached on a rotary drum are a head Hw1 and a head Hr1 (whose azimuth angle is $-\Theta$) which are located in opposite positions apart by 180°, and a head Hw2 and a head Hr2 (whose azimuth angle is $+\beta$) which are also located in opposite positions apart by 180°. Another head Hr3 (whose azimuth angle is $+\Theta$) is attached on the drum 3 in a position apart from the head Hr1 by 90°. Recording of the narrow-track new format and RAW operation are done by the heads Hw1, Hw2, and reproduction of the new format is done by the heads Hr1, Hr2. Reproduction of a signal recorded in the old format is done by the heads Hr1 and Hr3.

6 Claims, 3 Drawing Sheets

RECORDING AND PLAYBACK APPARATUS USING A HELICAL-SCAN-TYPE ROTARY HEAD

This application is a continuation of application Ser. No. 08/510,846, filed on Aug. 3, 1995, now abandoned.

BACKGROUND OF THE INVENTION

1. Field of the Invention

This invention relates to a recording and playback apparatus using a helical-scan-type rotary head for recording code data, audio information, video information, and so forth, on a tape as a recording medium.

2. Description of the Related Art

There is known a rotary-head-type recording and playback apparatus using rotary heads for recording and reproducing digital audio data, digital or analog video data on and from a magnetic tape running along the cylindrical surface of a drum rotated at a predetermined speed. In recording, slant tracks are made successively on a magnetic tape. Upon playback, the heads scan these tracks. In order to increase the amount of recorded data by the guard-bandless approach, the azimuth recording system has been employed.

A narrow-track approach which diminishes track pitches would be another approach for increasing the amount of digital data on a given length of tape, i.e. on a cassette tape. The recorded pattern with narrow tracks is a new format with a different track pitch from those of old formats. It is necessary, in general, for a recording and playback apparatuses employing the new format to be available for recording and playback of the new format but also for playback of signals of the old format.

In case of the azimuth-recording system, the azimuth effect (the effect of suppressing the crosstalk from adjacent tracks caused by an azimuth loss) becomes large with an increase of the ratio of the bit length (the width of one bit of data taken in the lengthwise direction of the track) relative to the track pitch Tp on a tape (Tp/bit-length). This relation is explained in greater detail with reference to FIG. 1.

In FIG. 1, W represents the track width, Gr the gap line of the recording head, and Gp the gap line of the playback head. Gap lines Gr and Gp are not parallel but make an angle, $\Theta$. In this case, since the distributed phase of the flux density Bs(x) on the surface of the tape (normal to the plane of the paper) is not uniform on the gap of the playback head, an amplitude loss occurs in the playback signal. The loss is called gap inclination loss and gap angle loss.

The loss can be calculated by dividing the track width W into small segmental widths dz and integrating the contribution from each segmental track in terms of W. In case of recording a sinusoidal wave, since Bs(x) distributes in the form of Bsm cos($2\pi x/\lambda$), Bs at a point distant by z from the track center (x-axis) in the width direction is expressed as Bsm{$2\pi(x+z \tan\Theta)/\lambda$}. Therefore, the total flux $\phi$ entering into the gap line Gp of the playback head is expressed by the following equation.

$$\phi = \int_{-W/2}^{W/2} Bsm\cos\left(\frac{2\pi}{\lambda}(x + z\tan\Theta)\right) dz = \tag{1}$$

$$Bsm\frac{\lambda}{2\pi\tan\Theta} 2\cos\left(\frac{2\pi x}{\lambda}\right) \sin\left(\frac{\pi W\tan\Theta}{\lambda}\right)$$

If the gap inclination loss $L\Theta$ is defined as the ratio of the amplitude BsmW of $\phi$ under $\Theta=0$ relative to the amplitude of EQUATION (1) and is expressed in decibel, the following equation is introduced.

$$L\theta = 20 \log_{10} \frac{(\pi W/\lambda)\tan\theta}{\sin[(\pi W/\lambda)\tan\theta]} \text{ [dB]} \tag{2}$$

As seen from EQUATION (2), when W/$\lambda$ is large, the gap inclination loss is large, and the crosstalk from adjacent tracks can be reduced; and when W/$\lambda$ is small, the gap inclination loss is small, and the crosstalk from adjacent tracks increases. Therefore, when the track pitch Tp (=W) is decreased by the narrow-track approach, the azimuth effect is weakened particularly in long wave regions. To compensate for it, rotary heads with large azimuth angles are used.

As discussed above, at least two rotary heads with azimuth angles for the old format and at least two rotary heads with larger azimuth angles for the new format are required. Moreover, in a data storage device, it is necessary to verify by RAW (read after write) whether the digital data has been recorded properly. Ordinarily, therefore, heads for common use in playback and RAW are provided, which results in the use of eight heads in a data storage apparatus.

Mounting such a number of heads on a rotary drum complicates the arrangement of the rotary heads mechanism and hence increases the cost. Additionally, more channels in rotary transformers and more changeover switches as needed, which are additional factors that complicate the arrangement and increase the cost.

OBJECT AND SUMMARY OF THE INVENTION

It is therefore an object of the invention to provide a rotary-head-type recording and playback apparatus capable of reproducing data of an old format, as well, with fewer number of heads than in a conventional apparatus for equivalent functions, without inviting complication of the arrangement.

According to the invention, there is provided a rotary-head-type recording and playback apparatus including a first head and a second head attached to a rotary drum to have a first azimuth angle and a second azimuth angle different from each other, respectively, such that the first and second heads record a signal onto a tape-shaped recording medium and reproduce the signal from the tape-shaped recording medium, comprising: a third head attached to the rotary drum and having a third azimuth angle larger than the first and second azimuth angles; and means for selectively establishing a first operation mode using the first and third heads to record and reproduce the signal, or a third operation mode using one of the first and second heads and using the second head to reproduce the signal.

The apparatus can record and reproduce signals in the first format, and can also reproduce signals recorded in the second format. This is attained by using only three kinds of azimuth angles, which prevents an increase of the cost caused by using more heads.

The above, and other, objects, features and advantages of the present invention will become readily apparent from the following detailed description thereof which is to be read in connection with the accompanying drawings.

DETAILED DESCRIPTION OF THE PREFERRED EMBODIMENTS

Figure 1:
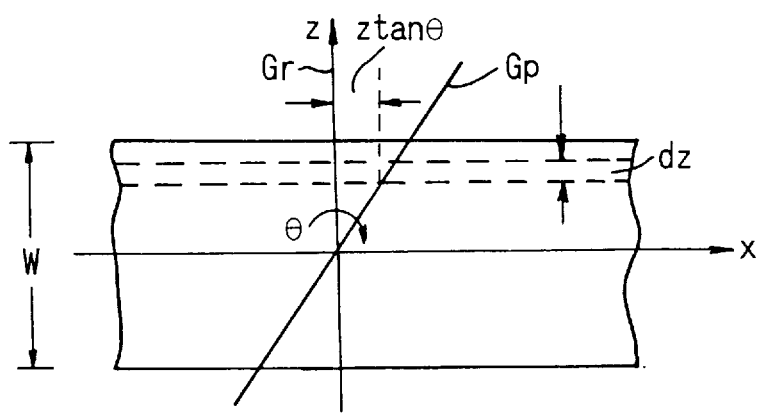
FIG. 1 is a schematic view for explanation of an azimuth recording.
Figure 2:
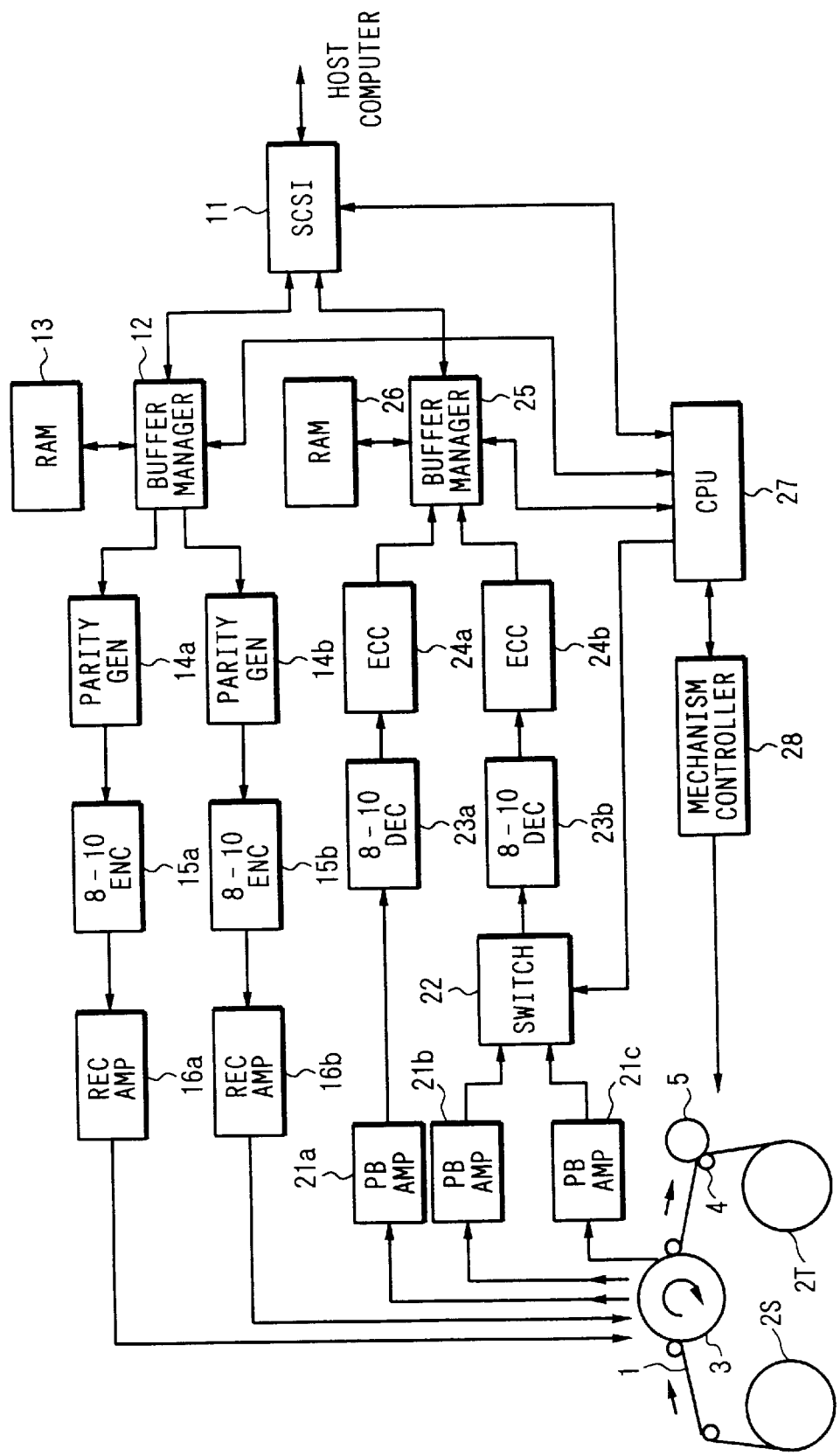
FIG. 2 is a block diagram illustrating a system arrangement according to an embodiment of the invention.

An embodiment of the invention is described below with reference to the drawings. This embodiment is a data storage system of a computer, having a general arrangement shown in FIG. 2. Numeral 1 denotes a magnetic tape which is unrolled from a supply reel 2S, wound aslant onto the cylindrical surface of a drum 3 rotated at a predetermined rate, propelled by a capstan 4 and a pinch roller 5 to travel at a constant speed, and taken up onto the takeup reel 2T. The supply reel 2S and the takeup reel 2T are housed in a cassette. The magnetic tape 1 rounds the drum 3 over an angle slightly larger than 180°.

The drum 3 comprises, for example, a stationary lower drum and a rotatable upper drum. Attached to the rotatable drum are recording heads Hw1, Hw2, common heads Hr1, Hr2 for reproduction and RAW, and a playback head Hr3. Two of these heads for making adjacent tracks are disposed to have different gap lines, so that recording with no guard-band (a region on which no signal is recorded) is possible.

The recording heads Hw1, Hw2 and the common heads Hr1, Hr2 for playback and RAW are used for recording and playback using a format with a small track pitch (called new format). To reproduce a tape with a signal according to a format with a larger track pitch (called old format), the playback head Hr3 is used. That is, the head Hr3 and the head Hr1 enable playback of a tape with the old format.

Recorded data is supplied to a buffer manager 12 from a host computer (not shown) via SCSI interface 11. The data is stored in buffer memory (RAM) 13 associated with the buffer manager 12. Data is read out from the buffer memory 13 by the buffer manager 12, and processed in two channel pathways.

One of the signal processing pathways includes a parity generator 14a, 8-10 modulating encoder 15a, and recording amplifier 16a. Similarly, the other signal processing pathway includes a parity generator 14b, 8-10 modulating encoder 15b, and recording amplifier 16b. The parity generators 14a, 14b generate parities of error correction codes. 8-10 modulation pertains to converting each data word into a code word of 10 bits such that direct current components and low frequency components of the recorded data are reduced by the modulation. Output signals of the recording amplifiers 16a, 16b are supplied to the recording heads Hw1, Hw2, respectively, via rotary transformers (not shown). Data is thus recorded as slant tracks on the tape 1.

Data reproduced from the magnetic tape 1 by the playback heads, Hr1, Hr2 and Hr3, are supplied to the playback amplifiers, 21a, 21b and 21c, respectively, through rotary transformers (not shown). Output from the playback amplifier 21a (reproduced signal from the head Hr1) is supplied to an error correction circuit 24a through an 8-10 modulation decoder 23a. Output from the playback amplifier 21b (reproduced signal from the head Hr2) and output from the playback amplifier 21c (reproduced signal from the head Hr3) are supplied to the switch circuit 22.

As explained above, the head Hr1 is commonly used for both new and old formats, whereas the head Hr2 is used for the new format and the head Hr3 for the old format. Therefore, the switch circuit 22 selects one of signals from these heads according to the format of the tape to be reproduced. The switch circuit 22 is switched by a control signal from CPU 27. CPU 27 gives the switch circuit 22 a control signal corresponding to the format of the tape under reproduction in response to a user's operation of a key or by an automatic diagnosis.

The reproduced signal selected by the switch circuit 22 is supplied to the signal processing pathway including the 8-10 decoder 23b and the error correction circuit 24b. The error correction circuits 24a, 24b correct errors by decoding error correction codes. Reproduced data through two signal processing pathways, respectively, are stored in buffer memory 26 under control by the buffer manager 25. The reproduced data are transferred to the host computer via SCSI interface 11 upon request.

As to recording by the new format, the signal processing pathways verify immediately after the recording whether the data has been recorded properly. This is possible by interrupting the supply of a recording current to the recording heads Hw1, Hw2 during the period where these heads do not trace the magnetic tape, and by processing errors in the data reproduced by the heads Hr1, Hr2 in the error correction circuits 24a, 24b.

CPU 27 controls the buffer managers 12, 25 and the interface 11. CPU 27 also controls the mechanism controller 28 including a reel drive system, drum drive system, capstan drive system, and so forth. Although not shown, instruction signals through operation keys, various conditions, etc. are entered in the CPU 27.

Figure 3A:
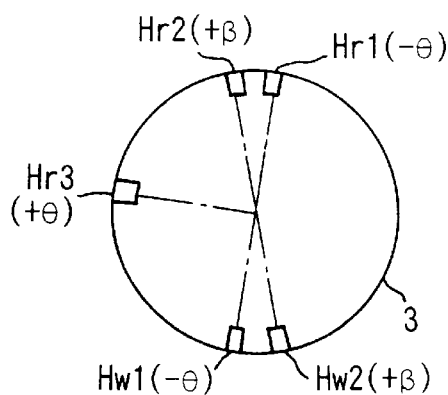
FIGS. 3A and 3B are schematic views for explanation of the heads arrangement in the embodiment of the invention.
Figure 3B:
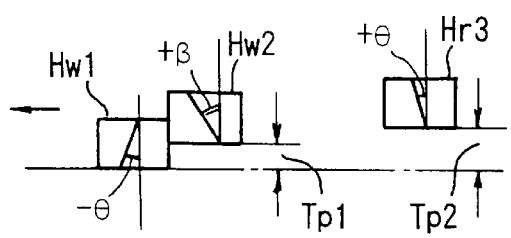

FIG. 3A shows angular positions of the heads attached to the drum 3, and FIG. 3B shows heights of the positions of the heads in an enlarged scale. The recording heads Hw1 and Hw2 are in very close positions. More specifically, a double azimuth head having two gaps, integrally, can be used. Located apart from the recording heads Hw1, Hw2 by the angular distance of 180° are common heads Hr1, Hr2 for reproduction and RAW. Further located apart from the reproduction and RAW common head Hr1 by the angular distance of 90° is the playback head Hr3. The playback head Hr3, however, may be located in any position other than the illustrated example.

Figure 4:
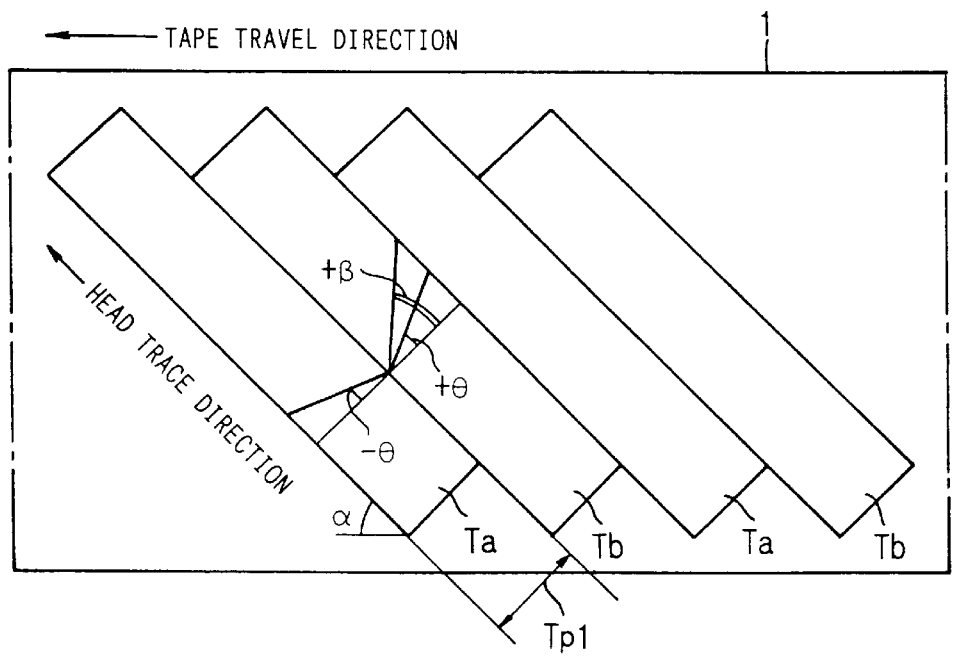
FIG. 4 is a schematic fragmentary view showing the track pattern and the azimuth angle in the embodiment of the invention.

The azimuth angles of the heads are three kinds: $+\Theta$, $-\Theta$ and $+\beta$. The azimuth angle of the heads Hw1, Hr1 is $-\Theta$, that of the heads Hw2, Hr2 is $+\beta$, and that of the head Hr3 is $+\Theta$. Polarities and absolute values of the azimuth angles are determined on the basis of a line orthogonal to the lengthwise directions of a track. FIG. 4 shows a pattern of tracks (for example, the new format) on the magnetic tape. The track Ta is made by the recording head Hw1, and the track Tb by the recording head Hw2. The interval between the tracks Ta and Tb is the track pitch Tp1 of the new format.

On the basis of a line orthogonal to the lengthwise direction of a track, the azimuth angle rotated in the clockwise direction is assigned with the negative polarity, and the azimuth angle rotated in the counterclockwise direction with the positive polarity. The track pitch Tp1 is determined by the difference in height between the heads Hw1 and Hw2 as shown in FIG. 3B. The value of the difference Tp2 of the position of the head Hr3 from the basic height line is chosen in relation with the track pitch of the old format.

When the azimuth angles of the old format are $\pm\Theta$, according to this embodiment the heads Hw2 and Hr2 are used with a larger azimuth angle $(+\beta)$ modified from $+\Theta$ together with the head Hw1 and Hr1 with the azimuth angle of $-\Theta$ to enable recording and reproduction of the new format with these heads. It is also possible to modify $-\Theta$ to larger $-\beta$; however, it causes a larger angular difference between the direction of orientation of the magnetic tape 1 and the normal line standing vertically from the gap, which is a disadvantage from the viewpoint of reproduced output.

Since the recorded tracks have the inclination of angle α from the lengthwise direction of the tape, the angular difference between the normal line standing from the gap and the direction of orientation of the tape 1 becomes large as the azimuth angle of −Θ increases. In contrast, the angular difference becomes smaller as the azimuth angle of +Θ increases. Smaller angular differences contribute to larger reproduced output, and are advantageous from the viewpoint of S/N ratio. That is, the head Hw2 and Hr2 having the azimuth angle of +β are sensitive along the orientation of the tape. Taking this into consideration, the foregoing embodiment modifies the azimuth angle of +Θ into a larger +β larger than it to obtain a gap inclination loss required for recording and reproduction of the new format.

Even when two azimuth angles are +Θ1 and −Θ2 instead of being negative and positive symmetrical values (±Θ), it is recommended to determine narrow-track azimuth angles by changing +Θ1 alone. Alternatively, when the absolute values of two azimuth angles, |Θ1| and |Θ2|, are different, one of the azimuth angles with the smaller absolute value may be changed.

The invention is not limited to the heads arrangement of the above-described embodiment. If RAW is not required, for example, heads for common use for recording and reproduction may be provided. Also, instead of locating the recording head and the playback head in close positions, they may be located in opposite positions 180° apart from each other. Additionally, the invention can also be applied to recording and reproduction of digital video signals, digital audio signals and analog signals without being limited to storage devices of computers.

As explained above, by changing one of two kinds of azimuth angles used by the old format into a larger angle and maintaining the other azimuth angle unchanged, the invention enables not only recording and reproduction of the new format but also reproduction of the old format by means of heads of three kinds of azimuth angles. Moreover, this is possible without increasing the number of heads, the number of channels of rotary transformers and the number of changeover switches. Further, complication of the design of the drum can be prevented by locating the common head for reproduction and RAW of the new format at the position opposite and 180°-apart from the recording head and by locating the head for playback of the old format at a position other than the 180°-opposite position.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A rotary-head-type recording and reproducing apparatus including a rotary drum and a recording medium selected from a first tape or a second tape, said first tape having a smaller track pitch than said second tape, said apparatus comprising:
   a first head and a second head being attached to said rotary drum and having a first azimuth angle and a second azimuth angle, respectively, which are different from each other;
   a third head being attached to said rotary drum and having a third azimuth angle larger than said first or second azimuth angle; and
   a controller for selectively controlling a first operational mode of recording and reproducing a data signal from said first tape using only said first and third heads, or a second operational mode of only reproducing said data signal from said second tape using only said first and second heads.

2. An apparatus according to claim 1, wherein said third head provides an increased sensitivity along the longitudinal direction of said first tape.

3. An apparatus according to claim 1, wherein said first azimuth angle has a different polarity than said second azimuth angle.

4. An apparatus according to claim 2, wherein said first azimuth angle has a larger absolute value than said second azimuth angle.

5. A rotary-head-type recording and reproducing apparatus, comprising:
   a first recording head having a first azimuth angle and a second recording head having a second azimuth angle of different polarity and absolute value than said first azimuth angle;
   first and second playback heads having substantially the same azimuth angles as said first and second azimuth angles, respectively;
   a playback exclusive head having an azimuth angle of substantially the same absolute value but of opposite polarity than said first azimuth angle; and
   a controller for selectively controlling a first operational mode of recording and reproducing a signal using only said first and second recording heads and only said first and second playback heads, respectively, or a second operational mode of only reproducing the signal using only said first playback head and said playback exclusive head.

6. Apparatus according to claim 5, further comprising a rotary drum for supporting said first and second recording and reproducing heads and said playback exclusive head, and wherein said first and second recording heads are spaced apart from said first and second reproducing heads by substantially 180° on said rotary drum, said playback exclusive head spaced apart from said first and second recording and reproducing heads on said rotary drum.

* * * * *

UNITED STATES PATENT AND TRADEMARK OFFICE
CERTIFICATE OF CORRECTION

PATENT NO. : 5,886,843
DATED : Mar. 23, 1999
INVENTOR(S) : Ozue et al.

It is certified that error appears in the above-identified patent and that said Letters Patent is hereby corrected as shown below:

On the title page: Item

Under [30]  Foreign Application Priority Data

Change "6-205938" to --6-205935--

Signed and Sealed this

Twenty-seventh Day of July, 1999

Attest:

Q. TODD DICKINSON

*Attesting Officer*  *Acting Commissioner of Patents and Trademarks*